April 7, 1953 G. C. REIS 2,633,745
DEVICE FOR RECORDING SPEED AND DISTANCE TRAVELED
BY VESSELS PASSING THROUGH WATER
Filed April 28, 1951
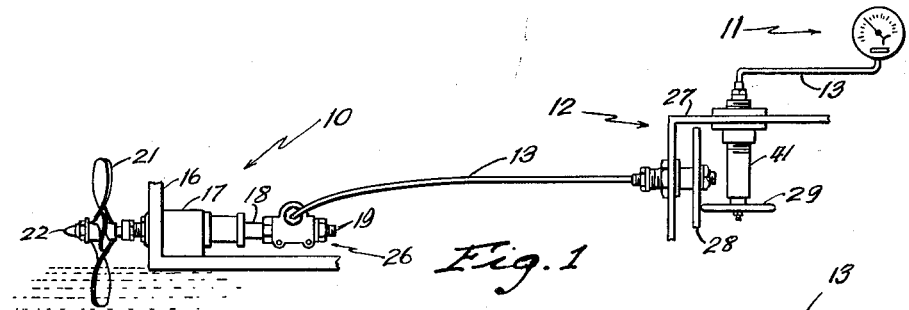
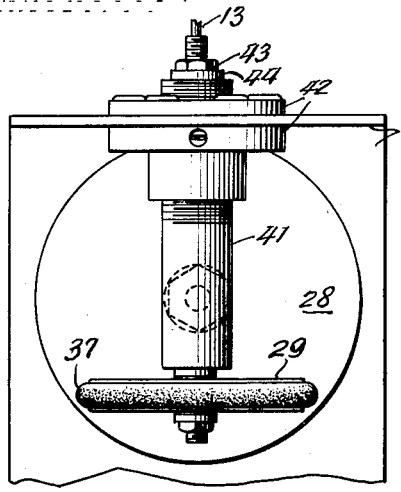
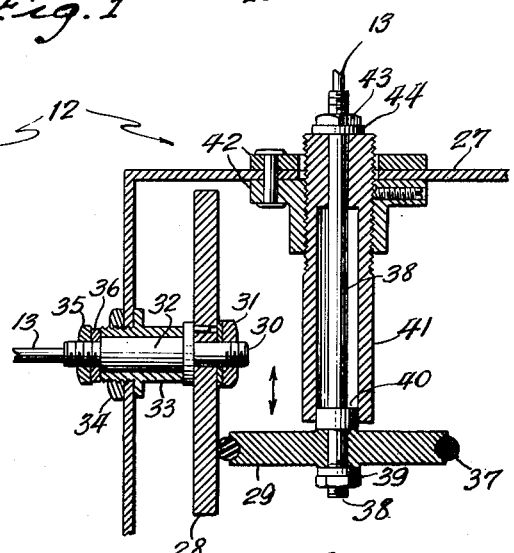
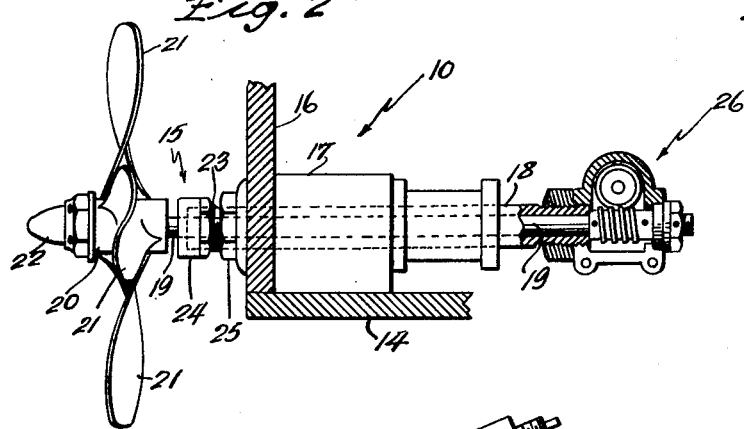
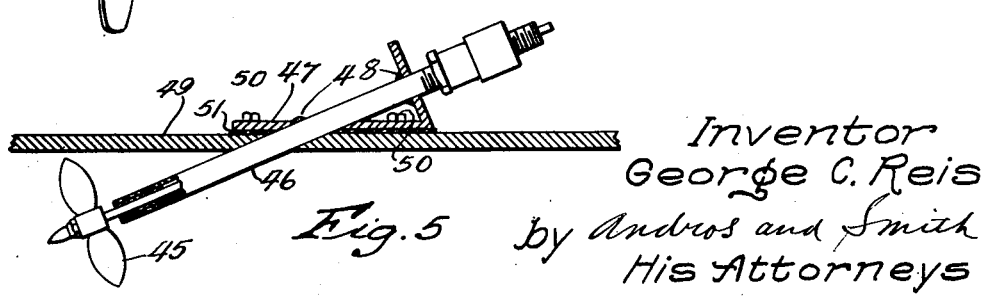
Inventor
George C. Reis
by Andros and Smith
His Attorneys Patented Apr. 7, 1953

2,633,745

UNITED STATES PATENT OFFICE 2,633,745

DEVICE FOR RECORDING SPEED AND DISTANCE TRAVELED BY VESSELS PASSING THROUGH WATER

George C. Reis, Bolton Landing, N. Y.

Application April 28, 1951, Serial No. 223,489

1 Claim. (Cl. 73—187)

This invention relates to improvements in recording devices for vessels passing through water, having particular reference to a device of a novel character in which the actual distance traveled by a vessel can be recorded, as well as the speed thereof; and the provision of such a device is a principal object of the invention.

It is understood from the patented and other literature that there are available various types of marine speedometers; and the use of "taffrail" distance recording devices also has been suggested. However, such devices, besides being complicated, are not readily adaptable to be adjusted to compensate for such variants as slipping, friction, wind, tide, currents, and the like, in the manner of the structure hereinafter described. It has been recognized that it would be a distinct improvement to be able to overcome such difficulties and disadvantages as above indicated, and this is accomplished by means of the present invention.

Generally, it is an object of the invention to provide such a device which is adapted for use on any type of vessel, whether it be ocean, lake or river craft, self-propelled or otherwise, which is simple, yet sturdy and durable of construction, economic of manufacture, and otherwise well suited to the purposes for which it is intended.

More specifically, it is an object of the invention to provide a device for recording the distance, and speed traveled by a vessel passing through water, comprising a water impelling drive assembly adapted to be mounted in the vessel, a portion of which assembly is constructed to extend outwardly of the vessel with means thereon in contact with the water in order to actuate the drive of the assembly when the vessel is in motion, a meter for recording the speed and distance traveled by the assembly and a slip-load compensator mechanism cooperatively associated with the assembly and the meter, and being so constructed and arranged that it can be adjusted to adapt it to the particular vessel in which it is mounted, as well as the means for driving the assembly, and adapted to compensate for other variant influences to record the actual speed and distance traveled.

A further object of the invention is the provision of a slip-load compensator mechanism comprising two cooperatively associated elements, one of which is adapted to be actuated by an impeller drive assembly, and the other of which is adapted to actuate a distance and speed recording mechanism, the elements being axially movable with respect to each other for adjustment purposes in order to record actual distance and speed traveled by a vessel passing through water.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claim.

For a fuller understanding of the nature and objects of the invention reference should be had to the following detailed description taken in connection with the accompanying drawing, in which:

Fig. 1 is a somewhat diagrammatic illustration of an embodiment of the invention showing the combination of the impeller drive assembly, the recording meter and slip-load compensator;

Fig. 2 is a plan view of the slip-load compensator, somewhat enlarged, looking into a portion of the housing;

Fig. 3 is a transverse sectional view of Fig. 2;

Fig. 4 is an enlarged view of the impeller drive assembly, portions thereof being illustrated in section and other portions thereof being broken away; and Fig. 5 is an elevational view, partly in section, of an impeller of a modified form of the invention illustrating the same as intended for use in water submerged position.

Referring more particularly to the drawing, there is indicated generally at 10, 11 and 12, respectively, a water impelling drive assembly, a standard odometer-speedometer unit, such as, for example, the type used in automobiles for recording the distance traveled, as well as the speed of travel, and a slip-load compensator mechanism. These units are cooperatively connected to operate in synchronism by any suitable means, such as, for example, a flexible cable diagrammatically depicted as at 13 and 13'. For small craft a flexible cable, shaft or equivalent is preferred.

As illustrated in the drawing, the water impelling drive assembly 10 is mounted in the aft end of the craft, a fragmentary portion of which is shown at 14. A portion of the assembly indicated generally at 15 extends through the stern or transom 16 in an offset position either to port or starboard in such a manner that it is out of the wash of the propeller stream. The body of this assembly comprises a housing or header 17 in which is mounted a shaft bearing housing 18 having journaled therein a rotating impeller shaft 19. The portion of the impeller shaft 19 which extends outwardly of the vessel carries a rotatable impeller element 20, similar to a conventional propeller, having a plurality of blades 21 thereon.

It is a particular feature of the invention that any suitable impeller element which is adapted to be actuated by contact with the water as the vessel is propelled therethrough can be utilized and it is not essential that the number of blades, if such are used, be definite or that the pitch of such blades be definite. In fact, by means of the present invention, any suitable type of such impeller can be adapted to the particular craft in which it is used. The impeller is held in place by an impeller nut 22 and a bearing housing 23 supports the aft end of the impeller shaft 19 where it extends through the transom 16. A bearing cap 24 is secured to the bearing housing as is also a lock nut 25. At the forward end of the shaft 19 within the craft is a conventional type of worm reduction gearing arrangement, suitably housed, indicated generally at 26, and this mechanism needs no further detailed description.

The meter 11, as above indicated, is suitably graduated or calibrated for marine use and may comprise, in addition to recording functions, those of speed of travel. Preferably, the impeller 20 is only partly submerged as indicated in Fig. 1 of the drawing.

The slip-load compensator 12 preferably is mounted in a housing 27 and preferably comprises two relatively rotatable friction disks 28 and 29 mounted at substantially right angles to each other in adjacent wall portions of the housing. As illustrated in the drawing, the disk 28 is secured to a rotatable shaft 30 by means of a lock nut 31, the shaft being rotatable in a bearing sleeve or bushing 32 journaled in a fixed bearing 33 in the housing 27, the same being held in fixed position by a lock nut 34. The other end of the shaft 30, where it extends through the bushing 32, is threaded to receive a nut 35 and spacer washer 36 for take-up purposes against end play and otherwise to hold it in rotatable position. This end of the shaft may be apertured in a conventional manner to receive the end of the flexible shaft or cable illustrated at 13, which cable is similarly connected to the drive assembly. As further illustrated in the drawing, the disk 29, preferably provided with a peripheral frictional element, such as, for example, a rubber ring or tire 37, is secured to a rotatable shaft 38 by means of a lock nut and washer arrangement 39. This shaft may have secured thereto, or be provided with, an integral annular ring bearing 40 mounted in the end of a sleeve bearing 41 which in turn is suitably mounted in a fixed bearing 42 secured to an adjacent wall 27 of the compensator housing. The other end of the shaft is threaded to receive a nut 43 and spacer washer 44, similar to the nut and washer 35 and 36 for performing the same functions as the latter two elements. The shaft 38 is also apertured at this end to receive the portion of the flexible shaft or cable illustrated at 13 which connects it to the meter 11. It will be observed that the sleeve 41 is threaded into the fixed bearing 42 so that it, as well as the shaft 38 and disk 29, can be moved axially between the center and the periphery of the disk 28.

It should be noted that the slip-load compensator, because of its adjustable features, is, in effect, the crux of the invention. That is to say, with this type of simplified arrangement the necessity for having a rotatable impeller especially designed for each type of craft in which it is mounted is eliminated. In other words, the compensator is so constructed and arranged that it is readily adaptable to accommodate any kind of rotatable impeller regardless of the number or pitch of the blades if such are used. With this compensator a measured mile or knot can be selected, regardless of whether it is on a seaway, lake, river, canal or other water-way and, taking into consideration such variants as slippage, friction, wind, tide, currents and the like, the measured mile or knot can be traversed by the vessel and the compensator adjusted accordingly merely by axial movement of the disk 29 as indicated by the arrow in Fig. 3. The advantage of being able to record the exact distance traveled by such a craft, regardless of the speed of travel, should now at once become obvious by a knowledge of this particular device and its arrangement. For example, regardless of such variants as those above mentioned, and even when traveling through fog or darkness when a certain destination or objective is selected, such as by reference to a navigation chart or by common knowledge of the navigator, the course can be traveled and the destination approached by reference to the meter which will substantially accurately record the actual number of miles or knots traveled with reliable assurance of arrival.

In the modification of the impeller drive assembly illustrated in Fig. 5, it will be seen that the bladed impeller 45 is completely submerged below the water level. This type of arrangement can be used on any vessel, between the fore and aft portion and either to port or starboard so long as it is out of the propeller wash of a power driven vessel. The structure for mounting the impeller shaft housing 46 is simple and expedient. Preferably, it comprises an angular plate 47 to which the housing 46 is secured as by welding as indicated at 48. Holes are drilled through the shell 49 of the vessel or craft to accommodate the fastening bolts 50, a suitable gasket 51 being interposed between the base of the plate 47 and the shell 49.

It will thus be seen that the objects hereinbefore set forth may readily and efficiently be attained, and since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

In a device for simultaneously and automatically recording the speed and distance traveled by a speed boat passing through water, comprising in combination a bearing sleeve to be mounted in the transom of said boat laterally of the horizontal axis and above the water line thereof, an impeller shaft journaled within said bearing to be mounted substantially parallel to said water line and to extend forward and aft of said transom; a rotatable impeller mounted on the aft end of said shaft, said impeller having blades of a length to extend partly below said water line to be rotated into and out of contact with said water when said boat is in motion; gear reduction means on the forward end of said shaft; a rotatable cable connected at one end to said means and at its other end to a shaft journaled in a bearing therefor; a slip-load compensator comprising a rotatable friction driving disc mounted on said last named shaft, an axially adjustable driven shaft journaled in a bearing, which shaft carries a driven disc at one end frictionally engageable peripherally with a face of said driving disc; a second rotatable cable connected at one end to the other end of said driven shaft; and an odometer-speedometer connected to the other end of said cable.

GEORGE C. REIS.

REFERENCES CITED

The following references are of record in the file of this patent:

UNITED STATES PATENTS

| Number | Name | Date |
| --- | --- | --- |
| 527,464 | Thorn | Oct. 16, 1894 |
| 2,210,388 | Vail | Aug. 6, 1940 |

FOREIGN PATENTS

| Number | Country | Date |
| --- | --- | --- |
| 24 | Great Britain | Jan. 1, 1878 |